Aug. 26, 1969

U. L. BECKMANN 3,464,011

SELF-BALANCING SYSTEM FOR OBTAINING IN-LINE COUNTER-TYPE
READOUT OF UNKNOWN VOLTAGE INPUT SIGNAL WITH EXPANDED
OPERATIONAL MODE TO PROVIDE ADDITIONAL
DIGIT IN READOUT

Filed May 31, 1966

INVENTOR
Uwe L. Beckmann

BY Pierce, Scheffler & Parker
ATTORNEYS

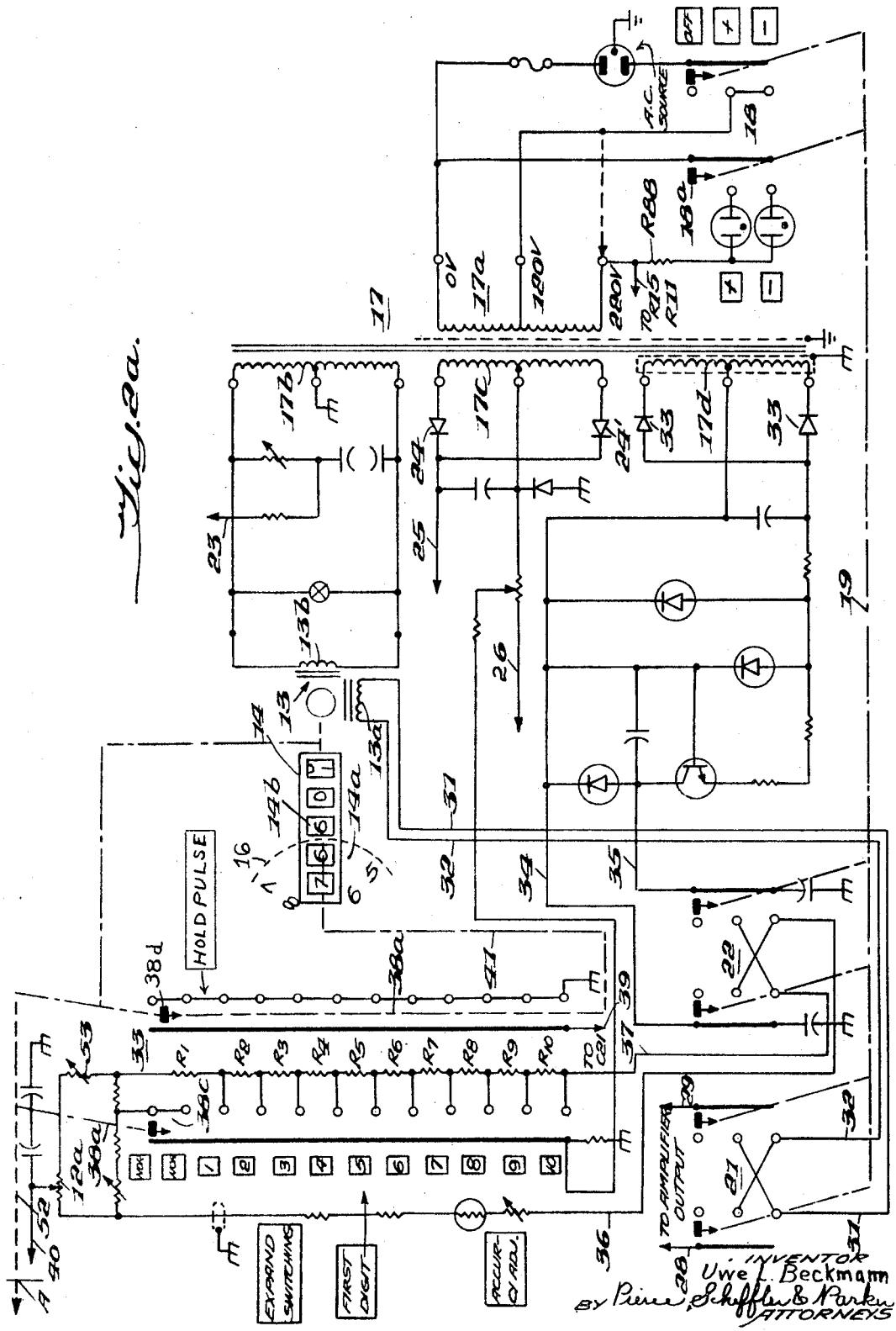

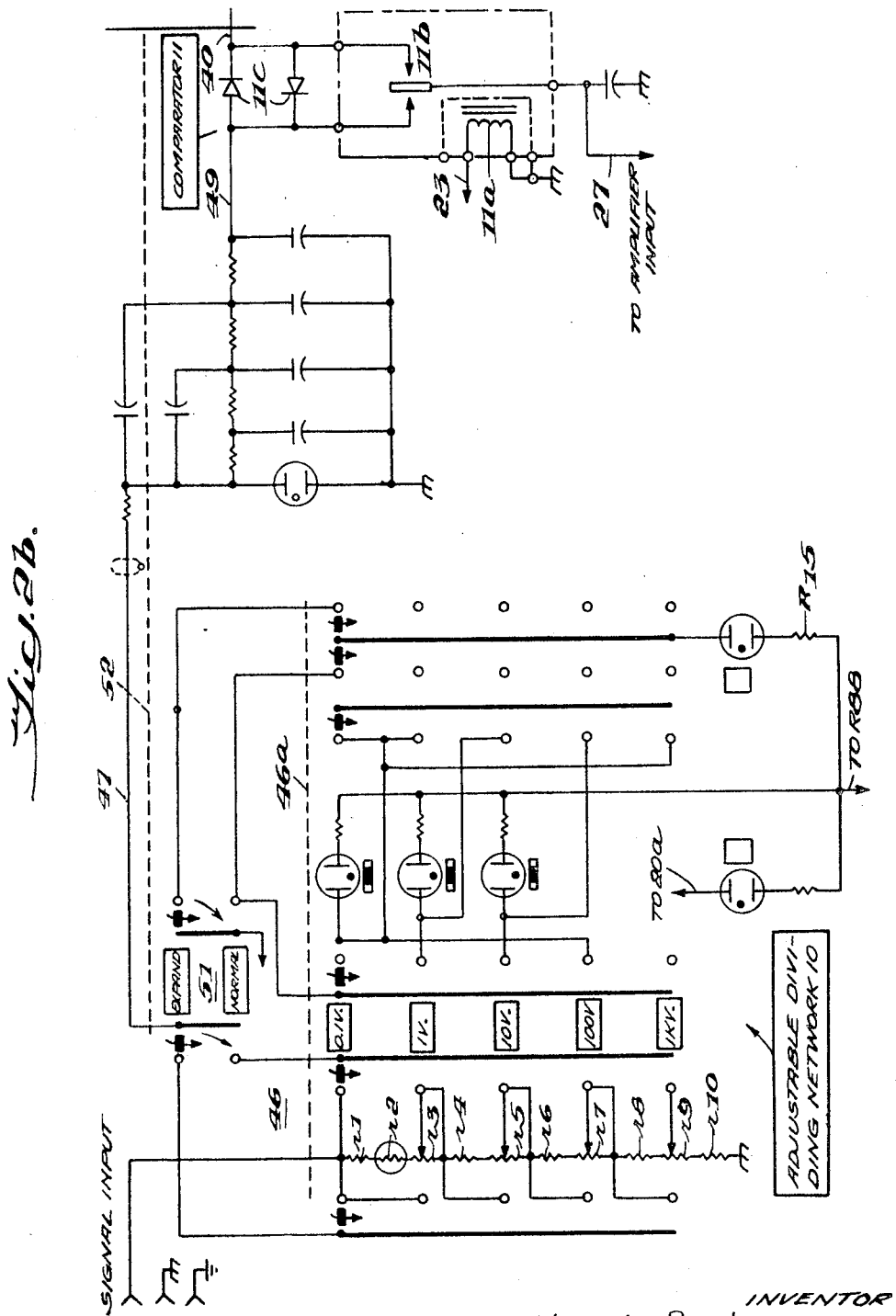

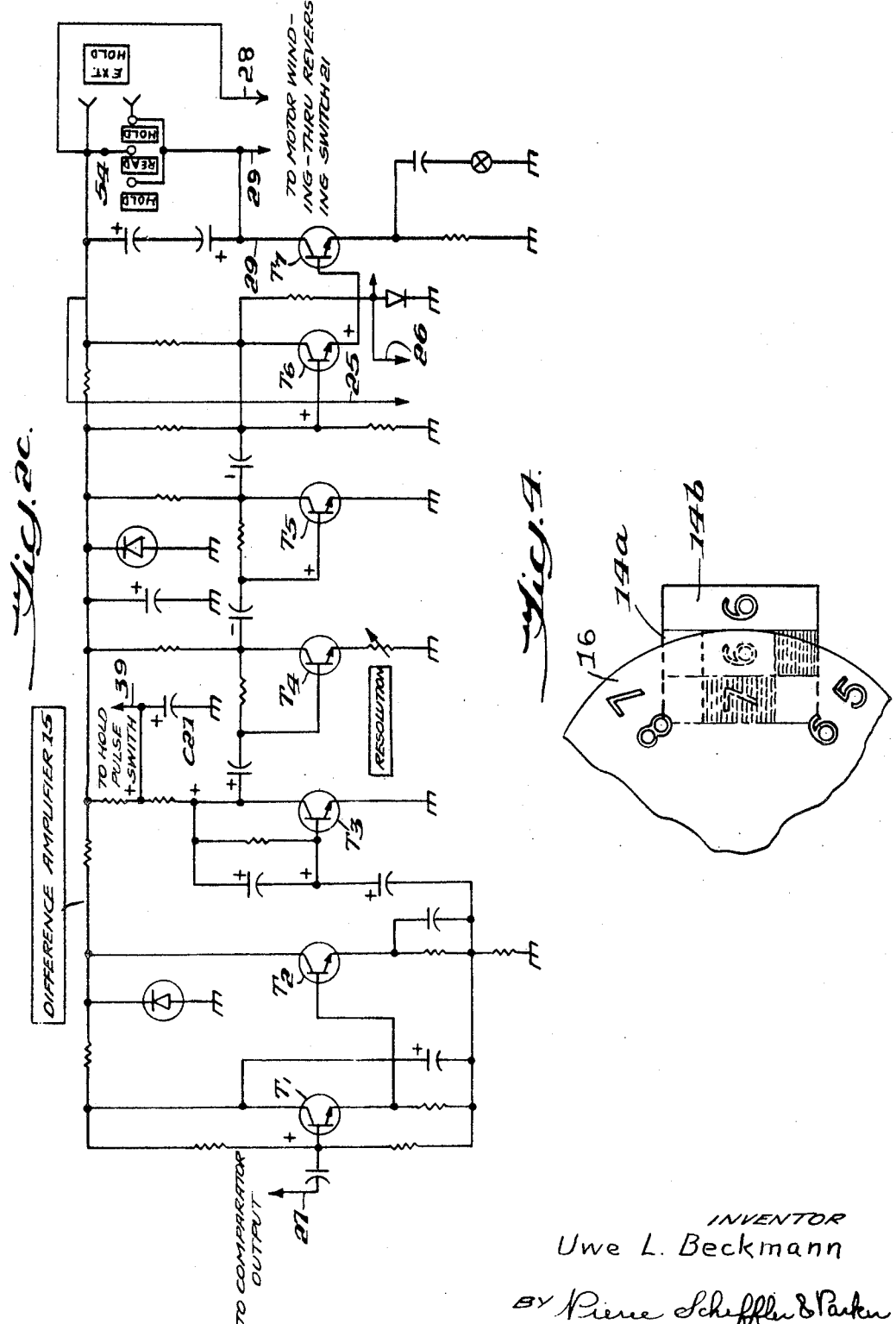

United States Patent Office 3,464,011
Patented Aug. 26, 1969

3,464,011
SELF-BALANCING SYSTEM FOR OBTAINING IN-LINE COUNTER-TYPE READOUT OF UNKNOWN VOLTAGE INPUT SIGNAL WITH EXPANDED OPERATIONAL MODE TO PROVIDE ADDITIONAL DIGIT IN READOUT
Uwe L. Beckmann, Rockaway, N.J., assignor, by mesne assignments, to The Singer Company, New York, N.Y., a corporation of New Jersey
Filed May 31, 1966, Ser. No. 554,174
Int. Cl. G01r *17/06*
U.S. Cl. 324—99                                    7 Claims

ABSTRACT OF THE DISCLOSURE

An electrical system of the self-balancing type for obtaining a counter-type digital readout of an unknown input voltage includes a multiple decade type input attenuator for the input voltage, a comparator circuit which compares the input voltage at the output of the attenuator with a variable reference voltage and a reversible motor driven by the difference voltage appearing at the output of the comparator circuit which adjusts the reference voltage in such direction as to effect rebalance between the signal and reference voltages. A mechanical turns counter of the decade type is mechanically coupled with the variable reference voltage so as to initially obtain a corresponding in-line coarse digital readout of the magnitude of the unknown voltage and a finer reading is then obtained by insertion of an extra digit in the readout corresponding to the most significant digit in the coarse reading. Insertion of the extra digit results in a corresponding change in the reference voltage accompanied by a reduction of one decade in the input signal attenuator, and the system is then allowed rebalance a second time.

---

The present invention relates to an electrical measurement system using a self-balancing circuit which gives an indication of the measured electrical quantity on an in-line, counter-type readout.

A principal object of the invention is to increase the accuracy and precision of the measurement, and this is attained by adding one or more digits to the readout by manual selection.

In a conventional self-balancing circuit of the general type described, the incoming signal, e.g. a voltage signal whose amplitude is to be indicated digitally by a counter-type readout comprising several decades, is passed through a dividing network or attenuator, often referred to as a range selector, into a comparator circuit which, in its simplest form is constituted by a mechanical switch of the chopper type. The comparator compares the incoming signal voltage with a reference voltage derived from a variable reference voltage source such as a continuously variable potentiometer, and any instantaneous difference between the signal and reference voltages is amplified and used to drive the motor which adjusts the reference voltage output from the potentiometer in such a direction as to effect a rebalance of the signal and reference voltages. When a rebalanced condition is achieved, the difference voltage and hence the voltage input to the amplifier becomes zero and the motor is stopped. The position of the potentiometer shaft at the moment of balance can then be used as a measure of the incoming signal voltage, and by coupling the potentiometer shaft to a mechanical turns counter of the decade type one thus obtains a corresponding in-line digital display of the magnitude of the signal voltage.

The limitations of a self-balancing circuit of the above conventional construction are usually found in the accuracy and resolution of the potentiometer and in the time required for the system to obtain balance.

As indicated, the objectives of the present invention are to effect a substantial increase in the accuracy of the system by manually adding one or more digits to the readout, and to automatically change these digits when the range of the added digit, or digits is exceeded. The improved system also includes a holding circuit which serves to "hold" the readout during manual selection of the digit or digits to be added.

The foregoing as well as other objects and advantages will become more apparent from the following detailed description of one suitable embodiment of the improved measuring system and the accompanying drawings wherein:

FIG. 1 is a block type electrical schematic of the improved system;

FIGS. 2a, 2b, and 2c combined show the detailed circuitry of the block schematic;

FIG. 3 is a face view of the complete instrument showing the manual controls for operating the range selector switch, the digital expand switch, power input control switch, zero adjuster, hold-read-hold switch and also the decade type counter together with the reference step display dial by which one or more digits are added to the counter readout; and FIG. 4 is a detail showing the arrangement for effecting a torqueless digit transfer which will change the manually selected digit position of the reference step display dial to the next higher number when the potentiometer approaches the upper limit of the expanded range, thereby providing for correct display with overlapping ranges.

With reference now the drawings and to the block schematic shown in FIG. 1, the electrical input signal desired to be displayed digitally is applied to an adjustable dividing network 10 and the output from this network in the form of a voltage is applied to a comparator 11. Also applied to comparator 11 is the voltage output of a reference supply which is composed of two parts connected in series. One part 12a is continuously variable and can be constituted by a standard type potentiometer. The other part 12b is a resistance manually adjustable in discrete steps and constitutes the expand selector. The potentiometer reference supply part 12a is driven by a two-phase motor 13 to vary its output voltage and digital counter 14 is driven either from the potentiometer shafting or from separate shafting coupled directly to the motor. In either case, rotation of motor 13 drives the potentiometer 12a in such direction as to produce a progressively changing output voltage equal to the sum of the voltages across 12a and the in-circuit part of 12b which is applied to comparator 11. When the latter achieves balance with the signal output voltage of dividing network 10, the voltage output from comparator 11 is zero and hence, the input to amplifier 15, whose output serves to drive motor 13, falls to zero and motor 13 stops thus stopping potentiometer 12a and digital counter 14 at a reading representative of the amplitude of the signal voltage to be measured.

As will be later explained in further detail, the one or more digits to be added to the readout on counter 14 in order to increase the accuracy and precision of signal measurement are developed through the manually adjustable part 12b of the reference supply voltage and a reference step display 16 which is mechanically coupled to part 12b so that the digital indications on the reference display are progressively changed in accordance with a progressive, step-like change made in the manually adjustable reference voltage supply part 12b.

Associated with the manually adjustable reference voltage supply part 12b is a "hold" circuit which is applied to amplifier 15 to block any output therefrom while the reference voltage supply part 12b is being shifted from one step to another, thus holding the readout during manual selection of the particular digit which is to be added by reference display 16 to the digits indicated on counter 14.

FIGS. 2a, 2b and 2c show the details of the various circuits which combine to establish the block schematic represented in FIG. 1. With reference to these views, the power supply for the instrument is adaptable to either 120 or 220 volt operation by the alternative connections indicated in FIG. 2a to the primary 17a of power transformer 17. The connections of this primary to the particular voltage supply available are effected by way of a three position switch 18, the operator and dial 18a of which are mounted on the face of the instrument as shown in FIG. 3. Switch 18 has an "Off" position and two "On" positions designated (+) and (−) respectively. The (+) position is used for "positive" voltage signals and the (−) position is used for "negative" voltage signals. In both of the "On" positions power is applied to transformer primary 17a from A.C. source input. However, it will be seen that the operator 18a for input switch 18 is mechanically connected by linkage 19 to two reversing switches 21, 22 so that these two switches will be in one position when switch 18 is in the (+) operating position and in the opposite position when switch 18 is in the (−) position. Switch 21 serves to reverse the connections from the output of amplifier 15 to one phase 13a of reversible motor 13 to prevent it from running in the wrong direction when the signal voltage is "negative," and switch 22 serves to reverse the connections to the series connected reference supply sources 12a, 12b thus reversing the polarity to work with the "negative" input signal voltage.

Transformer 17 is provided with three secondary windings 17b, 17c and 17d. Secondary 17b supplies power for the other winding 13b of motor 13 and also supplies A.C. power over conductor 23 to operate the coil 11a for chopper switch 11b which in cooperation with the protecting back-to-front diodes 11c function as the comparator unit 11 indicated on FIG. 2b.

The voltage on secondary winding 17c is rectified by diodes 24 and connected by conductors 25, 26 and ground to amplifier 15 shown in FIG. 2c to establish the necessary D.C. power supply for the various transistors T1 and T7 which amplify the input signal coming to it over conductor 7 from comparator 11. The output from amplifier 15 is connected by conductors 28, 29 to reversing switch 21 and from the latter by conductors 31, 32 to motor winding 13a.

The voltage on secondary winding 17d is rectified by diodes 33 and ultimately connected by conductors 34, 35 to reversing switch 22 and thence by conductors 36, 37 to the reference voltage supply parts 12a and 12b which are electrically connected in series. Part 12a is constituted by a conventional variable potentiometer of 0.1 volt maximum output and part 12b is constituted by a string of series connected fixed resistors R1 to R10. This resistor string establishes the necessary step changes in the reference voltage supply and a manually operated step switch 38 is provided for this purpose, the switch operator 38a and a step indicator dial 38b being mounted on the face of the instrument as shown in FIG. 3. Upon rotation of switch operator 38a, one switching member 38c is shifted in steps from the "normal" position depicted in FIG. 2a to insert the resistors R1 to R10 progressively in series with potentiometer 12a, and a second switching member 38d is likewise step shifted so as to establish a holding pulse over conductor 39 to condenser C21, and shorting it which maintains a zero output on amplifier 15 to thereby hold counter 14 while switch 38 is being stepped from one position to another. In either "Normal" position depicted in FIG. 2a only potentiometer 12a is connected in circuit and its variable output voltage having a maximum of 0.1 volt is fed over conductor 40 to one side of comparator 11. This constitutes a so-called "Normal Mode" of operation and is indicated on dial 38b of the stepping switch. At other positions of manually switched member 38c, referred to as an "Expand Mode," one or more of the fixed resistors R1 to R10 are manually connected in circuit with the motor driven, continuously variable potentiometer 12a and these positions are indicated respectively on dial 38b by numerals 1 to 10.

Coupled mechanically to the rotatable switch operator 38a through a linkage 41, for actuation simultaneously with actuation of the stepping switch 38, is the reference display indicator 16 which takes the form of a rotatably mounted dial and which is thus also stepped rotatively about its axis as stepping switch operator 38c is stepped from one position to another along resistors R1 to R10. As shown in the face view of FIG. 3, and also in the circuit diagram of FIG. 2a, dial 16 which provides the desired additional digit indication which is added to the number of digits provided by counter 14 to establish the expanded digital readout, is provided with two circular sets of numerals arranged around the dial periphery so as to enable them to be brought into line adjacent the window opening in the counter casing through which is read the number on the left digit drum 14b of the counter. The circular set of numerals on dial 16 closest to the periphery of the dial correspond in position to the same numerals on switch dial 38b. Thus, when dial 38b is set to the position depicted in FIG. 3, which is switch position "6" in the vertical row of number boxes seen in FIG. 2a, the same number "6" will appear beside the left digit drum in counter 14. The second circle of numerals on dial 16 set further in from the periphery differs from the first by an increase of one digit, or step. Thus, for example, to the left of numeral "6" in the outmost cricular row one finds numeral "7." As will be later explained, this provides a torqueless digit transfer which will effectively change the indicated manually selected digit in the outmost circular number row on dial 16 to the next higher number, since this dial is so constructed that only a number on the outer row or on the inner row is visible on the face of the instrument as seen in FIG. 3. The torqueless digit transfer at dial 16 automatically provides for a correct display with an operating condition of overlapping ranges and since there is no mechanical inter-connection between the counter and switch operator 38a no possibility arises of any interference of one with the other.

In the present embodiment, dial 16 is opaque and the two circular rows of numbers thereon, from 1 to 11 and 1 to 10 are established by number cut-outs through which light is passed to the observer in a selective manner. As indicated somewhat diagrammatically in FIG. 4 by a development of the leftmost digital drum 14a of the counter, the number marking of the zero (0) on drum 14a has been replaced by a white area 44. Also the surface has been extended and a same size black area 45 added to the left of area 44. Similarly, the one (1) marking has been replaced by a black area 46 and a white area 47 has been added to the left of it. Areas 44 and 46 rotate with counter drum 14a beneath the outermost row of number cut-outs on dial 16. In the counter position indicated in FIG. 4, which corresponds to that of FIGS. 2a and 3, a white area 44 appears on the right of drum 14a and the cut-out number 6 on the outermost circular row of numbers on dial 16 is visible to the observer by light reflection from the white section 44. The cut-out number 7 on dial 16 at the left side of number 6 is not visible since a darkly colored section 45 on the left of drum 14a then beneath this number absorbs the light passing through this number cut-out.

Now, in the event that counter 14, in continuing to be driven by motor 13 to achieve signal balance at comparator 11, causes the most significant digit drum 14a in the counter to advance from a "0" position depicted to the next higher decade thus to become a "1," the readout with the extra digit provided by dial 16 would be in error unless its reading is also changed to the next higher number. This is achieved automatically since a dark section 46 on digit drum 14a will absorb light transmittal through number cut-out "6" on the outermost number row on dial 16 and a white section 47 will reflect light through number cut-out "7" on the innermost number row on dial 16. In this manner, one thus achieves an essentially torqueless transfer from one digit to the next higher digit on dial 16 which can be used for range extension or overlap purposes. If desired, three times 3 areas similar to areas 44 through 47 can be utilized in conjunction with three circular rows of number cut-outs on dial 16 so as to enable one to obtain a torqueless digit transfer to the number next below the manually selected display on dial 16, as well as a transfer to the next higher number which the present embodiment provides.

The improved digital indicating instrument is designed to accept input signal voltages ranging from 0 v. to 1 kv. It is for an accommodation of this rather wide range in signal input that the voltage dividing network 10 is provided. In the present embodiment, the voltage divider network is an attenuator which comprises a string of series connected resistors R1 to R10, to one end of which the input signal is connected. As the voltage range is increased in decade steps, i.e. from the lowest range of 0–0.1 v. to 0–1 v., 0–10 v., 0–100 v., and 0–1 kv., the voltage dropping resistors R1 to R10 are stepwise inserted to provide the necessary attenuation by means of a manually operated range selector switch 46 shown in FIG. 2b. Switch 46 is operated by means of a rotatable actuating member 46a mounted on the front of the instrument panel, as shown in FIG. 3, concentric with switch actuator 38a of the expand switch. The range selector switch actuating member 46a is provided with a suitable index such as the dot depicted thereon which is directed towards the particular range selected, these ranges being marked in a circular array outwardly of the expand dial 38b.

The output voltage from dividing network 10 which varies in proportion to the incoming signal voltage to be digitally displayed appears at conductor 47 and after being put through filter 48, is applied by conductor 49 to comparator 11 where it is then compared with the ultimately balancing voltage from the reference supply 12a, 12b.

Also associated with voltage dividing network 10 is another switch 51 which, as shown on FIG. 2b, has two positions, "Normal" and "Expand." This switch is coupled by suitable linkage 52 back to the operating mechanism 38a for the expand switch 38 in such manner that when the latter is in a "Normal" position—with only potentiometer 12a connected in, and which corresponds to a "Normal" indicated position on dial 38b, switch 51 will also be in its "Normal" position. In any other position of expand switch 38, i.e. from 1 to 10, in which case one or more of the potentiometer resistor sections R1 to R10 are connected in series with potentiometer 12a, the linkage 52 sets switch 51 to the "Expand" position.

The purpose served by shifting switch 51 from "Normal" to "Expand" is to decrease by one decade the attenuation provided by network 10 for any particularly chosen setting of the range selector switch. By so doing, no change is required in the gain of difference amplifier 15 and the circuits associated with motor 13, since for a given deviation from balance, the magnitude of the difference signal at the output from comparator 11 remains the same. This would not, however, be the case if the comparison voltage from the reference supply 12a, 12b were altered. One thereby avoids the necessity for any manual readjustment of the input divider network 10. This allows a coarse measurement and digital indication with the expand switch 38 set in the "Normal" mode, and a fine measurement with the expand switch set in an expanded mode to be made with one and the same range switch setting.

The instrument includes a zero adjustment resistor 53 in the reference voltage supply 12a, 12b which can be adjusted from the face of the instrument at the point indicated by this same reference numeral in FIG. 3. Also, in addition to the automatic "Hold" provided by automatically short-circuiting condenser C21 in the output of amplifier 15 each time expand selector switch 38 is shifted from one position to another, an externally available "Hold" on the output of amplifier 15 is provided by means of a three position toggle switch 54 shown electrically in FIG. 2c. This switch located on the face of the instrument panel has a central "Read" position and two side "Hold" positions. In the central position, as depicted in the circuit, the switch contacts have no effect and do not interfere with the output from amplifier 15 which appears on conductors 28, 29. However, in either "Hold" position the switch contacts serve to place a shunt across conductors 28, 29 thus shorting the amplifier output, and preventing motor 13 from running. One of the "Hold" positions of toggle switch 54 effects only a temporary hold in that the switch lever will return to the central "Read" position when the finger pressure on the lever is released. The other "Hold" position of the toggle switch lever is a more permanent one in that once the lever has been moved to that position it will remain there until it has been moved again.

OPERATION

The improved instrument operates in the following manner. The "Expand" switch 38 is set to a "Normal" position by switch actuator 38a thereby connecting in only the potentiometer unit 12a as reference voltage. Range selector switch 46 is then set to the required range to accommodate the range of the input signal voltage, and the power input supply switch 18 is shifted from an "Off" position to the (+) or (−) operating position dependent upon the polarity of the input signal voltage. The instrument is then in its "Normal Mode" of operation and motor 13 will then run to start the run-up of counter 14 to product a coarse digital reading corresponding to the amplitude of the input signal voltage. As the counter runs up, so will also be run up the voltage output on potentiometer 12a until a balance is reached with the input signal voltage at comparator 11 whereupon the input to amplifier 15 will fall to zero and hence, cut off the amplifier output and power supply to one phase 13a of motor 13 thus causing motor 13 and the three decade counter 14 to stop. Counter 14 now provides a coarse measurement of the signal input voltage in which counter drum 14a indicates the most significant digit. Assuming that such digit is a "6," expand switch 38 is then shifted to position "6" which then causes rotation of reference display dial 16 to a position in which the number "6" in outermost circular array of numerals appears beside the "6" reading on counter drum 14a. By shifting expand switch 38 to position "6," the sum of resistances R1 to R6 in the reference supply unit 12b is added in series with potentiometer resistance 12a, and switch 51 associated with the range selector is shifted from its "Normal" to its "Expand" position which effects a decrease by one decade of the attenuation provided in the voltage dividing network 10. Also, while shifting expand switch 38 in a step-by-step manner from its initial position to position "6," a hold pulse is established between steps which, as previously explained, disables the read-out circuit leading to motor 13 by shorting-out the amplifier output.

The comparison circuit between input signal voltage and balancing voltage (12a+12b) will now balance again for an input signal voltage whose magnitude lies between $E_n$ and $(E_n+E)$, wherein $E_n$ is proportional to the most significant digit of the signal voltage which was determined previously in the "Normal Mode" of operation and E represents the voltage at potentiometer 12a. Thus, the resolution is increased by narrowing the range of the self-balancing circuit. Since $E_n$ is proportional to the most significant digit of the signal and the signal attenuation at the input dividing network 10 is decreased by one decade, the circuit will now rebalance again and one further digit is added to the counter read-out, in which the cost significant digit of the read-out is now the digit manually set on expand selector dial 16, and the remaining less significant digits are run up on counter 14. Thus, with switch 38 set in the "Expand Mode," one now obtains a fine measurement of the input signal voltage. The invention accordingly permits "coarse" and "fine" measurements of the signal voltage to be made with one and the same range switch setting.

If, in a rebalancing operation the previous most significant digit reading on counter drum 14a should increase by one number such as from a "6" to a "7" then the manually set "6" reading on dial 16 would no longer be correct. To prevent any mistake in the read-out, the torqueless digital transfer previously explained comes into operation so that the reader no longer sees a "6" in the outermost circular row of numbers on this dial but rather the "7" on the innermost number row now becomes the only number visible on this dial, and becomes the most significant figure on the final digital read-out quantity.

In conclusion, it is desired to point out that while one suitable embodiment of the invention has been described and illustrated, various modifications can be made in the construction and arrangement of the components without, however, departing from the spirit and scope of the invention as defined in the appended claims. Thus, for example, while the resistance of potentiometer 12a is assumed to be linearly variable and the step resistances R1 to R10 are assumed to have equal values, one can utilize a potentiometer unit 12a with a non-linear resistance winding characteristic, in which case resistance R1 to R10 would have unequal values.

Also, one could further modify the reference supply by using a current source instead of a voltage source to supply resistance 12a and the string of resistances R1 to R10, in which case the latter would be connectable selectably in parallel rather than in series.

Moreover, while the reference display unit as illustrated is self-correctable to indicate only the next-higher number in the event the most significant digit established during "Normal Mode" operation also increases by one number during the subsequent "Expand Mode" rebalancing operation, a similar self-correction in the case of a shift to a lower number can be effected simply by adding another circular row of numbers on dial 16 and using three times three areas instead of the four, 44, 45, 46 and 47 depicted in FIG. 4. In this case, the middle circular row on dial 16 would be the only row of numbers which are normally visible on manual set, and the rows to each side thereof would only develop the desired self-correcting readings respectively depending upon whether the most significant digit in the read-out changed in the "up" or "down" direction, depending upon whether the expanded range is exceeded at the upper or the lower limit.

I claim:
1. Apparatus for digitally indicating the amplitude of a signal voltage which comprises an adjustable voltage dividing network to which the input signal is connected, said network being of the decade type and being provided with an actuatable range selector switching means for attenuating the input signal in decade steps and providing an output therefrom proportional to the input signal, a first continuously variable reference voltage supply, motor means for driving said first reference voltage supply, a second reference voltage supply adjustable in discrete steps, an actuatable expand switching means for selectively producing a balancing comparison voltage, said expand switching means having a first "Normal Mode" position in which only said first reference voltage supply is established as an output comparison voltage, and a second "Expand Mode" position which establishes an output comparison voltage equal to the sum of said first reference voltage supply and one or more of said voltage steps of said second reference voltage supply, means comparing said voltage output from said voltage dividing network with said comparison voltage and producing the difference therebetween as an output, an amplifier receiving as input the difference voltage output from said comparing means and having its output connected to said motor means, a digital counter having a plurality of decade stages, said counter being actuated in accordance with the operation of said motor means and said first reference voltage supply, a reference step display which is actuated in accordance with the actuation of said expand switching means to display an added digit to the read-out provided by said counter corresponding to the number of voltage steps added by said second reference voltage supply, and switching means actuated by a shift in said expand switching means from "Normal Mode" operation to "Expand Mode" operation and connected in said voltage dividing network for decreasing attenuation thereof by one decade.

2. Digital indicating apparatus as defined in claim 1 and which further includes a "hold" circuit activated while said expand switching means is being shifted to add one or more steps in said second reference voltage supply to disable said read-out on said counter.

3. Digital indicating apparatus as defined in claim 2 wherein said "hold" circuit disables said counter read-out by cutting off the output from said amplifier and thereby stopping said motor.

4. Digital indicating apparatus as defined in claim 1 wherein said reference step display includes a plurality of alternatively visible digital rows and means controlled by the most significant digit decade of said counter for rendering one or another of said digital rows visible thereby to indicate when the range of a digit added by said reference display is exceeded.

5. Digital indicating apparatus as defined in claim 4 wherein said means controlled by said most significant digit decade of said counter for rendering visible one or another of said digital rows on said reference step display is comprised of a plurality of side-by-side bands having alternately appearing light absorbing and light reflecting sections thereon, said bands being allocated to the respective digital rows on said reference step display such that when a digit on one row becomes visible the next numbered digit in another row becomes invisible and vice versa.

6. Digital indicating apparatus as defined in claim 1 wherein said reference step display is constituted by a rotatable member having an arcuate row of numbers thereon and which row is positioned adjacent the most significant digit indicated on said counter.

7. Digital indicating apparatus as defined in claim 1 and which further includes a power source for its operation and which can be switched from one input position to another to reverse the polarity of said first and second reference voltage supplies and thereby accommodate input signals of either positive or negative polarity respectively.

References Cited

UNITED STATES PATENTS

| | | | |
|---|---|---|---|
| 345,755 | 7/1886 | Wirt | 324—98 |
| 2,229,009 | 1/1941 | Berry | 324—131 |
| 2,497,961 | 2/1950 | Shaw | 324—131 |
| 2,873,428 | 2/1959 | Bruno et al. | 324—131 |
| 2,981,107 | 4/1961 | Anderson | 324—115 XR |
| 3,090,916 | 5/1963 | Gill | 324—131 XR |

RUDOLPH V. ROLINEC, Primary Examiner

E. F. KARLSEN, Assistant Examiner

U.S. Cl. X.R.

324—115